United States Patent [19]

Schroyer

[11] 4,345,481
[45] Aug. 24, 1982

[54] DIGITAL TORQUE METER SYSTEM

[75] Inventor: Kenneth Schroyer, Slidell, La.

[73] Assignee: Instruments, Computers and Controls Corp., Slidell, La.

[21] Appl. No.: 156,055

[22] Filed: Jun. 3, 1980

[51] Int. Cl.³ .............................................. G01L 3/12
[52] U.S. Cl. .............................................. 73/862.34
[58] Field of Search ........................ 73/136 A, 862.34

[56] References Cited

U.S. PATENT DOCUMENTS 3,604,255 9/1971 Bart ................................ 73/136 A
3,897,766 8/1975 Pratt, Jr. et al. ................ 73/136 A

FOREIGN PATENT DOCUMENTS 1470167 4/1977 United Kingdom ............ 73/862.34

OTHER PUBLICATIONS

Khvilivitskil, et al., "Electronic Torsion Meter", *Meas. Tech.* (USA), vol. 14, No. 10, Oct. 1971, pp. 1514–1516.

*Primary Examiner*—Charles A. Ruehl
*Attorney, Agent, or Firm*—C. Emmett Pugh

[57] ABSTRACT

A system for obtaining torque and angular velocity of a load transmitting shaft (such as for example the power drive shaft in a marine propulsion system) and adapted to obtain the efficiency and power output of the shaft. The system makes use of a matched pair of optoelectronic sensors, each comprising a pair of light sources, a pair of optoelectronic pick-ups and a relatively rotating interrupter member. The pair of optoelectronic sensors permits an accurate measurement of the relative angular displacement of the relatively rotating members. The system converts a binary-type optical message into electrical pulse signals which are processed to provide readings of torque, angular velocity, power output and shaft efficiency. The optoelectronic sensors are positionally adjustable by means of set screws, and the system can be calibrated by means of self-test circuits. The optical pick-up includes a vertical array of individual optical fibers. Additionally each optical pick-up utilizes a dual set of light detectors, one above the other, with each interrupter member having an upper, smaller width portion and a lower, larger width portion with a central vertical slot therein, causing the two lights detectors to sense the following cylical, sequential conditions as the interrupter passes by: lower detector first blocked, upper detector then blocked, lower director unblocked and then reblocked (slot), upper detector unblocked, and then lower detector unblocked.

13 Claims, 8 Drawing Figures

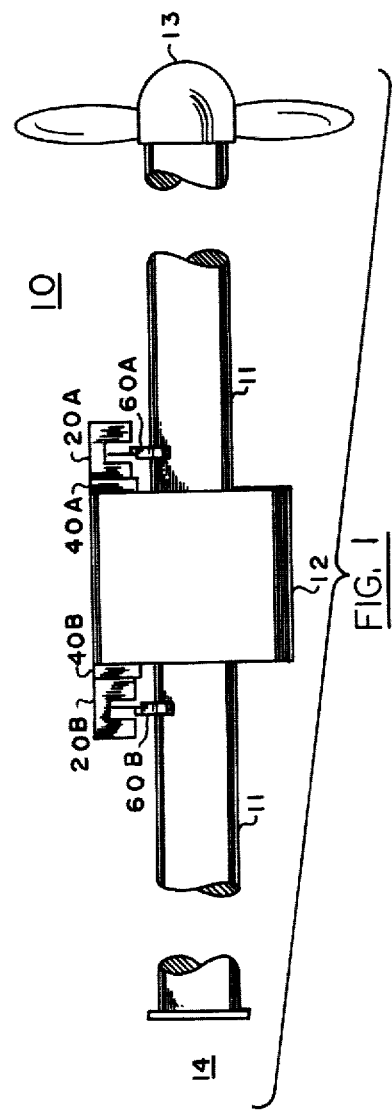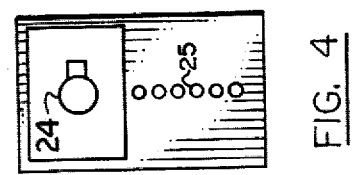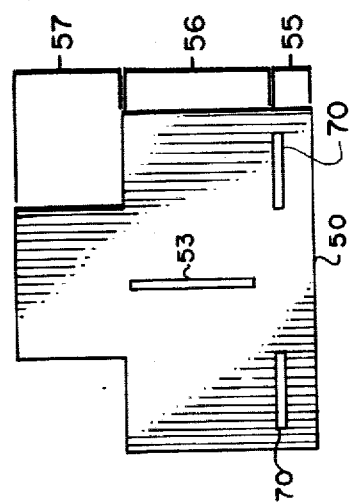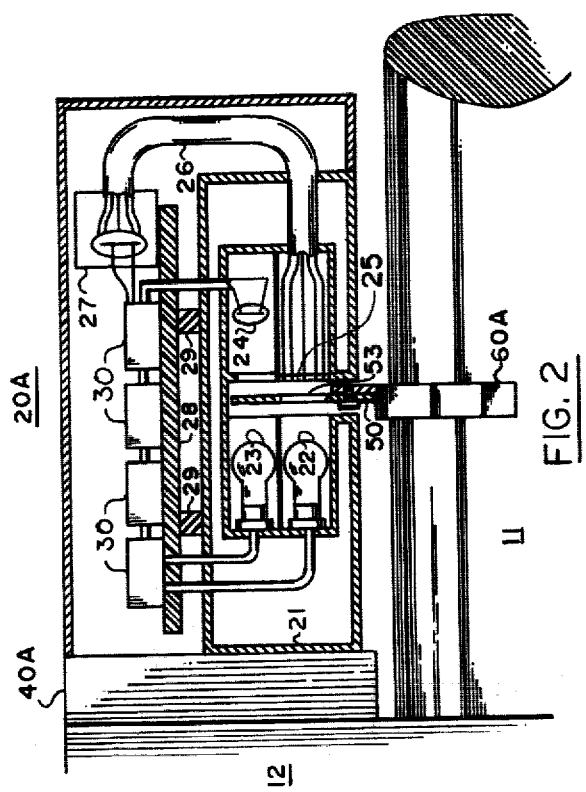

DIGITAL TORQUE METER SYSTEM

BACKGROUND OF THE INVENTION

1. Field of the Invention

The present invention relates to a system for measuring torque in a rotating shaft by means of generating and processing optically derived electrical signals which are a function of the torsional deflection of the shaft. The present invention further relates to a system for measuring angular velocity, power output and efficiency of a rotating shaft by means of generating and processing optically derived electrical signals which are functions of the angular velocity and torsional deflection of the shaft.

2. Description of the Prior Art

Devices for measuring torque through electronic conversion of optical signals generally are well known in the prior art. Attention is called to U.S. Pat. Nos. 3,196,675 (Buchele, et al, issued July 27, 1965); 3,495,452 (Johnson, Jr., et al, issued Feb. 17, 1970); 3,897,766 (Pratt, Jr., et al, issued Aug. 5, 1975); 3,940,979 (Ward, et al, issued Mar. 2, 1976); 3,111,028 (Lebow, issued Nov. 19, 1963); 3,950,986 (Parkinson, issued Apr. 20, 1976); 3,625,055 (Lafourcade, issued Dec. 7, 1971); 3,596,100 (Hollick, issued July 27, 1971); 3,604,255 (Bart, issued Sept. 14, 1971); 3,545,265 (McIlraith, et al, issued Dec. 8, 1970); 3,960,012 (Ingram, issued June 1, 1976) and 4,166,383 (Lapeyre, issued Sept. 4, 1979).

The prior art optical torque meters—Johnson, Jr., et al, Pratt, Jr., et al, and Buchele, et al—utilize a deflection principle in which light is transmitted from a light source and reflected from a shaft onto an optoelectronic sensor for subsequent signal processing into convenient form. This reflection method is hampered by errors produced by inconsistent turn-on times of the optoelectronic sensor caused by scattered light which results in decreased intensity of reflection.

The prior art optical torque meters that utilize a direct beam pick up similar to that used in the present invention generally are all mechanically intricate and involve complex shaft attachments such as slotted rotating disks (Ward, et al), toothed flanges (Lebow), toothed wheels (Parkinson), double shafts with a rotating disk on one of them (Lafourcade), and light polarizing screens (Hollick). These devices are expensive and time-consuming to machine, require specific technical knowledge to install and service, cannot be placed on a shaft different from that on which it was initially placed without machining alterations, utilize complex circuitry in which conversion of analog signals to digital readouts is necessary, and suffer a scattered light problem similar to the deflective torquemeters mentioned above.

Systems for measuring power, angular velocity and shaft efficiency generally are also known. Such devices use a variety of relatively complex methods—e.g. a proximity pick-up located adjacent to gears mounted on the shaft and generating alternating current waves (Bart), magnetic sensors (McIlraith, et al), and assemblies to separately generate signals proportional to torque and angular velocity (Ingram). In addition to the necessity of analog to digital signal conversion and the relative complexity of the measurement process, none of the prior art devices use optical signal transmission as does the present invention.

SUMMARY DISCUSSION OF THE INVENTION

It is a primary object of the present invention to provide a novel modification of and improvements upon the optical torquemeter systems disclosed in the prior art. Specifically the present invention seeks:

(1) to provide an optical torquemeter that eliminates the necessity for analog to digital conversion;

(2) to construct a torque, angular velocity, horsepower, and efficiency monitoring system capable, at least in part, of integrated circuit fabrication;

(3) to provide a system capable of being calibrated either with the shaft motionless or in motion; and (4) to construct a system that provides consistent and accurate turn-on of the optoelectronic pick-ups at appropriate times.

The present invention provides numerous improvements and advantages over the prior art in that all computations are electronic, direct and automatic, that high precision readings are facilitated, that attachment to a shaft and interchange of shafts is simplified, that indications of torque, horsepower, angular velocity and shaft efficiency are provided, that all read-out measurements are extremely rapid, and that the overall system is compact, light weight and economical to manufacture.

The present invention utilizes two optoelectronic sensors mounted on a bearing housing by means of an adjusting plate. Each sensor includes a pair of light sources and a corresponding pair of optoelectronic pick-ups. Each sensor is positioned so that an interruptor plate mounted on a shaft will be interposed between the light sources and the corresponding pick-ups, blocking the light transmission, during each revolution of the shaft.

Preferably each optoelectronic sensor includes a primary set of a light source and a light detector and a secondary set of a light source and a light detector positioned one above the other in radial array, with the interrupter having at least two, radially spaced portions or sections, a lower portion in which a vertical radial, slot is centrally located and an upper portion having a lesser width, with the two interrupter sections creating a different pattern or timed sequence of light blocking and light passing or unblocking with respect to the two sets of light sources and detectors. The interrupter of the secondary set is used to electrically control the out-putting of the primary detector so that its output is only seen or used when the interrupter is passing by. Also, the primary light source is preferably formed by a vertical, radial array of fiber optics producing a thin, straight line light source similar in size and configuration to the slot in the interrupter, which combination produces a particularly accurate, precise timed indication of the passage of the interrupter.

Each optoelectronic sensor is identical except for the mounting location of each along the shaft. Sensors can be positioned apart any convenient distance along the shaft. A correction factor for distance separation can be set into the microprocessor.

The microprocessor monitors the sequence of interruption of the light source and records the time difference between interruptions from the two optoelectronic sensors. Several time difference recordings are averaged and the amount of twist of the shaft is calculated using appropriate constants describing the modules of rigidity, shaft diameter and shaft construction. The detected amount of twist, which is extremely small, that occurs in the shaft is directly proportional to the torque in a shaft and follows in a linear pattern over the range of torque applied for propulsion. In other words, the maximum torque does not normally exceed the elastic limits of the shaft.

Although the torque in a rotating member is along an arc, the amount of twist that takes place is so small that no measurable error is introduced when twist or flexure is evaluated as a linear displacement along a chord subtending this radial arc.

The modulus of rigidity in any particular shaft is readily ascertainable by known methods using specific weights to load the shaft and comparing actual twisting with modulus of rigidity tables provided by the shaft manufacturer and based upon the alloyed steel and type of heat treatment involved. Thereafter, by calibrating the microprocessor and the sensors, the output signal provided by the same can be made directly proportional to and representative of actual shaft torque.

Since, as described above, the modulus of rigidity of any particular shaft may be readily computed, it is therefore only necessary to measure the magnitude of the twist in the shaft over a specific distance, which measurement indicates the torque of the shaft under load.

Sensors are tested and calibrated during manufacture and are matched so as to be interchangeable. Interruptors are precisely machined to make them identical. Sensors are mounted on a bearing housing by means of a mounting bracket which is attached to the bearing housing with epoxy or with bolts. Each mounting bracket contains an adjusting plate to which an optoelectronic sensor is attached. The adjusting plate and with it the attached sensor can be vertically or horizontally repositioned by means of set screws. Calibration of each sensor is accomplished by adjusting the set screws so that the fiber optics are in alignment with the slot on the interruptor. When alignment is achieved, a self calibration display from the microprocessor is activated. To avoid offset error, calibration should be performed when no torque is present on the shaft.

Angular velocity of the shaft is measured by evaluating the frequency of interruption of a light source on one of the optoelectronic sensors. Such evaluation directly determines shaft speed in revolutions per minute (RPM). A shaft horsepower (SHP) determination is derived from RPM and torque measurements by the following formula:

$$SHP = \frac{RPM \times TORQUE \text{ (in lb. ft.)}}{5252}$$

Efficiency of power is obtained by a simple calculation which takes a ratio of shaft horsepower to power input. The calculation is performed in the microprocessor.

The present invention thus provides an easily utilized and highly accurate optoelectronic means for obtaining torque, horsepower, velocity and efficiency measurements which heretofore were obtained by complex and marginally reliable devices, subject to the inaccuracies previously discussed with respect to the prior art.

BRIEF DESCRIPTION OF THE DRAWINGS

For a further understanding of the nature and objects of the present invention, reference should be made to the following detailed description taken in conjunction with the accompanying drawings in which like parts are given like reference numbers and wherein:

FIG. 1 is an over-all side view of the preferred embodiment of the digital torque meter system of the present invention as mounted on an exemplary propeller shaft propulsion system;

FIG. 2 is a cut away, side view of one of the sensor assembly of the embodiment of FIG. 1;

FIG. 3 is a front view of the interruptor plate, while

FIG. 4 is a front view of the optical pick-ups as used in the sensor assembly of FIG. 2;

DETAILED DESCRIPTION OF THE PREFERRED EMBODIMENT

Figure 5:
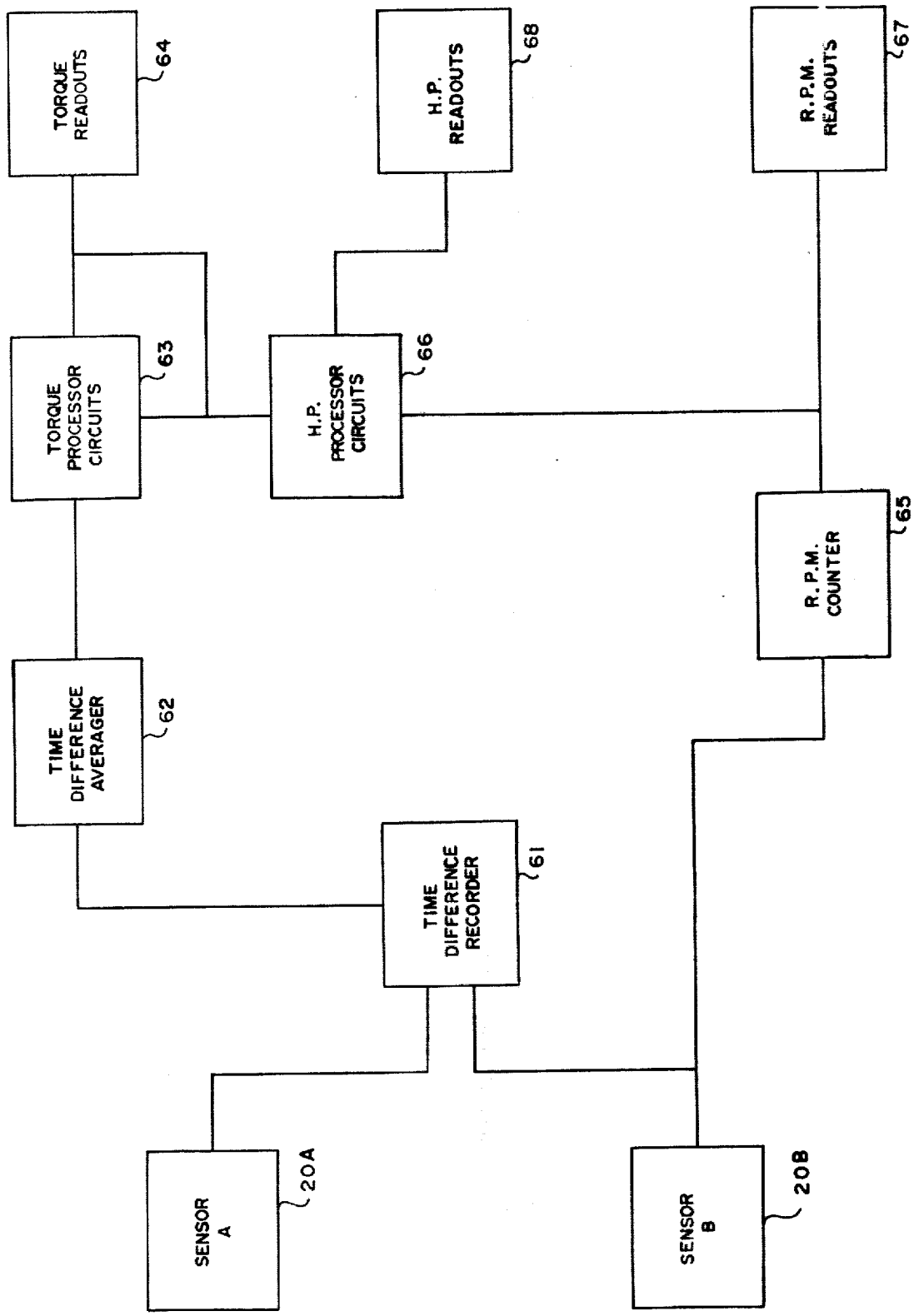
FIG. 5 is a block diagram schematic of the components involved in the processing of the optically derived signals into the various desired readouts.

FIG. 1 illustrates a general, exemplary propeller shaft assembly 10 comprising a shaft 11, a propeller 13 and an engine 14. In the preferred embodiment of the present invention, two optoelectronic sensors 20A and 20B are mounted one on either side of a bearing 12 by means of adjusting plates 40A and 40B, the frame of which is attached to the bearing 12 by means of for example epoxy or by bolts. One optoelectronic sensor 20A is mounted on the propeller side of the bearing 12, and the other optoelectronic sensor 20B is mounted on the engine side of the bearing 12. Two interruptors 50A and 50B are mounted on the shaft 11 by means of mounting brackets 60A and 60B attached to the shaft 11, one interruptor being positioned on each side to the bearing 12 so that the rotation of the shaft 11 will cause the interruptors 50A and 50B periodically and cyclically to be interposed between the light sources, primarily 22A and 22B and secondarily 23A and 23B, and the optical pick-ups, primarily 25A and 25B, and secondarily 24A and 24B of the optoelectronic sensors 20A and 20B, respectively.

The two optoelectronic sensors 20A and 20B can also for example be mounted on the shaft 11 by means of separate bearings and can be spaced apart at greater or lesser distances as desired.

FIG. 2 more closely details the structure of each optoelectronic sensor 20A and 20B. Each sensor comprises a sensor chassis 21 bolted to an adjusting plate 40A and 40B. To the sensor chassis 21 are attached one secondary light source 23, one primary light source 22 (each source comprising a conventional light emitter), one secondary optical pick-up 24 comprising a photodetector, one primary optical pick-up 25 consisting of a plurality of vertically arranged optical fibers, of which a front view is shown in FIG. 4, an optical cable 26 which leads from the primary optical pick-up 25 to an optical housing 27 mounted on a circuit board 28 which is separated from the sensor chassis 21 by means of spacers 29.

The secondary light source 23 is positioned radially above the primary light source 22 and both sources are positioned so that the interruptors 50 will sequentially block and unblock the light from each source from impinging on its respective optical pick-up, as discussed more fully below.

Figure 6:
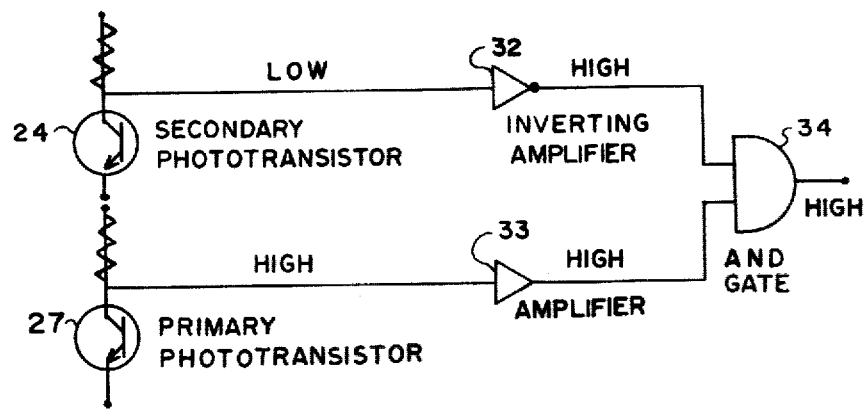
FIG. 6 is a schematic diagram of the circuitry involved in the production of electronic signals for further processing.

Various appropriate electronic modules 30, including the necessary circuitry for the system, are mounted within the housing for the optoelectronic sensors 20A and 20B. Typical exemplary circuitry is illustrated in FIGS. 5 and 6, discussed in greater detail below. A suitable power source (not illustrated) is of course included for the system.

FIG. 3 illustrates the interruptor 50 which comprises a stainless steel plate that is slotted in the middle. The slot 53 preferably is machined to the exact width of the primary optical pick-up 25, of which a front view of the fiber optics 25 mounted vertically in the detector chassis 21 is shown in FIG. 4.

Each interruptor plate 50 is a tri-level, thin plate. A representative gauge is between one-sixteenth and one-sixty-fourth inches. It is noted that the gap in the optical sensors 20A and 20B through which the interruptor plate 50 passes are as small as possible, for example one-eight of an inch, and generally the mounting hardware is not included within the gap as is shown in FIG. 2. The first level 55 is a rectangular mounting base with slotted bolt holes 70 for adjustably attaching the interruptor plate 50 onto a mounting bracket 60 which is mounted on the shaft 11 (note FIG. 8). The second level 56 is rectangular with a centered, vertical slot 53. The third level 57 is a solid, lesser width rectangle centered over the second level.

It should be noted that the foregoing breakdown into levels is for convenience of description and does not indicate separate pieces. The interruptor plate 50 can be and preferably is cut from a single piece of material. The preferred material for the interruptor plate 50 is stainless steel, although other metals and even plastics can be used. Representative dimensions associated with the interruptor plate 50 are as follows:

| (a) Mounting base level | 2 to 4 inches in width; |
| | ¼ to ⅜ inches in height; |
| (b) Second level | 2 to 4 inches in width; |
| | ⅝ to ¾ inches in height; |
| slot | 1/16 to 1/64 inches in width; |
| | ⅝ to ¾ inches in height; |
| (c) third level | 1 to 2 inches in width; |
| | ¼ to ⅜ inches in height; |

All of these dimensions are merely representative and the interruptor plate 50 can be enlarged or reduced in size without significantly affecting the performance of the digital torque meter.

The interruptor plates 50 rotate with the shaft 11. Each plate 50 is positioned so that each revolution of the shaft 11 causes the plates 50 to interrupt the light beams which would otherwise impinge on the optoelectronic pick-ups 20A, 20B. The light sources of each optoelectronic sensor 20A, 20B are arranged so that one source 23, called the secondary source, is positioned radially above another source 22, called the primary source.

During most of a revolution of the shaft 11 the interruptor plate 50 does not block the source lights 22, 23 from impinging on the pick-ups. However, as the plate 50 rotates into position, the leading edge of the plate 50 blocks the light from the primary light source 22. The plate and the primary light source 22 are arranged so that this blockage occurs at the second level 56 of the interruptor plate 50. (The third level 57 has not yet moved into position to block the light from the secondary source 23.) As the interruptor plate 50 rotates with the shaft 11, the light sources 22, 23 are alternately blocked and unblocked. The sequence of interruption referenced to interruption of the primary and secondary light sources 22, 23 by the interruptor plate 50 is as follows:

| LIGHT SOURCE | |
|---|---|
| Primary(22) | Secondary(23) |
| (a) blocked | unblocked |
| (b) blocked | blocked |
| (c) unblocked | blocked |
| (d) blocked | blocked |
| (e) blocked | unblocked |
| (f) unblocked | unblocked |

The above six step sequence is repeated once every revolution.

Each primary optoelectronic pick-up preferably comprises a vertical arrangement or array of thin optical fibers 25, one positioned above the other. The optical fibers 25 are connected by means of an optical cable 26 to an optical housing 27 which contains a photo sensor relatively insensitive to extraneous light. Each secondary optoelectronic pick-up comprises a photo sensor 24 which gates the signals from the primary light source 22 into a microprocessor. Signals pass to the microprocessor only when the interruptor slot 53 aligns with the primary optoelectronic pick-up 25, while at the same time the light from secondary source 23 to the secondary pick-up 24 is blocked by plate section or portion 57. This condition occurs once during each revolution.

FIG. 5 provides a block diagram of exemplary signal processing circuitry. The electronic signals derived from the optoelectronic sensors 20A and 20B are processed in a time difference recorder 61 to produce a signal proportional to the torsional deflection of the shaft 11. Many such signals are averaged in a time difference averager 62, and the resultant averaged signal is processed in a torque processor circuit 63 to produce a signal proportional to the torque developed in the shaft. The signal from the torque processor circuit 63 is displayed in convenient form by means of a torque readout circuit 64. The signal derived from an optoelectronic sensor is processed in an RPM counter circuit 65, and a resultant signal proportional to angular velocity is displayed in convenient form by means of an RPM readout circuit 67. Signals proportional to shaft horsepower are developed in the horsepower processor circuits 66, from signals derived from the torque processor circuit 63 and the RPM counter circuit 65. The signal produced in the horsepower processor circuit 66 is displayed in convenient form by means of a horsepower readout circuit 68.

FIG. 6 shows a schematic diagram of exemplary circuitry used to derive a signal to be processed further by the processor and counter circuits. The secondary phototransitor 24 converts an impinging optical signal from the secondary light source 23 into an electronic signal. The signal is inverted in an inverting amplifier 32 and is inputted into an "AND" gate 34. Similarly, the primary phototransitor 27 converts an impinging optical signal from the primary light source 22 into an electronic signal, which is amplified by an amplifier 33 and is inputted into the "AND" gate 34. The logic of the circuitry provides a signal that is amenable for further digital processing.

Figure 7:
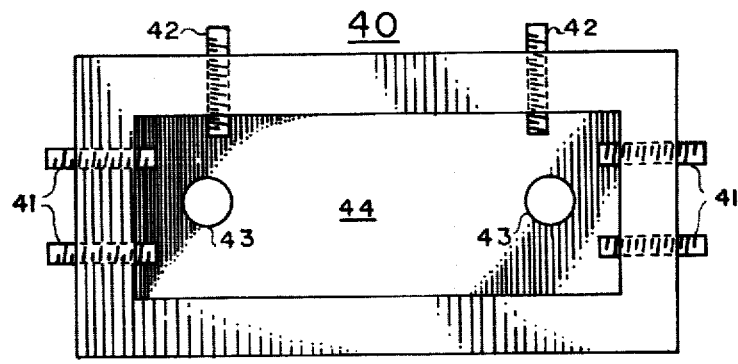
FIG. 7 is a front view of the adjusting plate for the sensor assembly of FIG. 2.

FIG. 7 more clearly details the structures of the adjusting plate 40. The sensor chassis 21 (see FIG. 2) is installed inside the milled area 44. The adjusting plates 40 all for example epoxied or bolted to the bearing 12. The mounting holes 43 are machined for example for quarter inch bolts for this purpose. The horizontal, adjusting Allen screws 41 and the vertical, adjusting Allen screws 42 are used for proper positioning of the sensor chassis 21 inside the adjusting plate 40 prior to "permanent" mounting.

Figure 8:
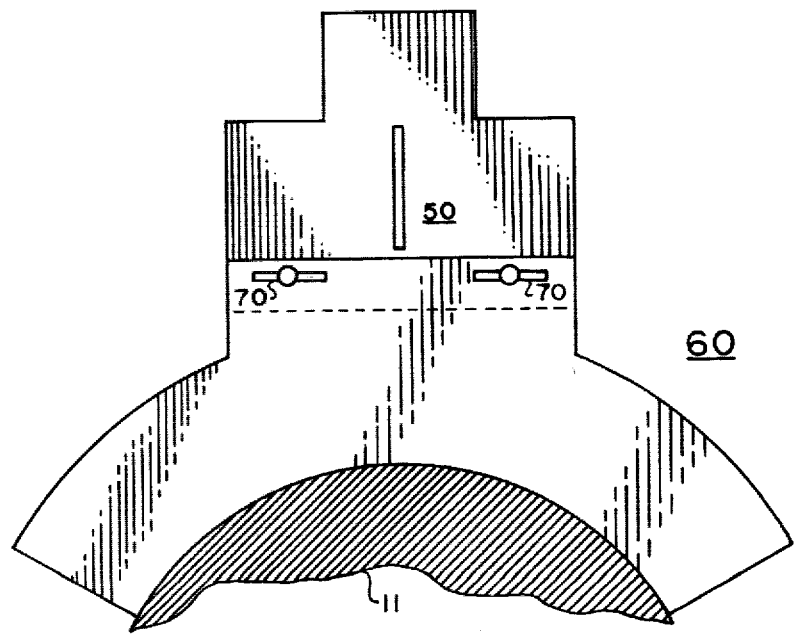
FIG. 8 is a front view of the mounting bracket with attached interruptor plate, with a partial view of the shaft, of the system of FIG. 1.

FIG. 8 more clearly details the mounting bracket 60 which mounts the interruptor 50 onto the propeller shaft 11. The lower portion of the mounting brackets 60 is machined to fit flush around the shaft 11. Permanent fastening of the mounting brackets 60 to the shaft 11 is accomplished for example either with the use of epoxy or by bolting. The interruptor 50 is bolted to the upper portion of the mounting bracket 60. Its position relative to the position of the corresponding sensor 20 can be adjusted by using the slotted holes 70 where the interruptor 50 is bolted to the mounting bracket 60. The mounting bracket 60A can for example be a quarter inch thick.

Because of the many varying embodiments that may be made within the scope of the inventive concept herein taught, and because many modifications may be made in the embodiment herein detailed in accordance with the disclosure requirements of the law, it is to be understood that the details herein are to be interpreted as illustrative, and not in a limiting sense.

What is claimed is:

1. A torque meter system for a load transmitting rotating shaft, comprising:
    first interrupter means for mounting on the shaft for rotation therewith;
    first electro-optical sensor means, having a primary light source and a spaced, primary light detector between which said interrupter means passes and temporarily blocks the light going from said light source to said light detector, for detecting when said first interrupter passes it;
    second interrupter means for mounting on the shaft at a longitudinally spaced position on the shaft for rotation therewith;
    second electro-optical means, having a primary light source and a spaced, primary light detector between which said second interruptor means passes and temporarily blocks the light going from said light source to said light detector, for detecting when said second interrupter mean passes it; and
    electrical circuit means connected to said first and said second electro-optical detector means for comparing the relative times said first electro-optical means and said second electro-optical means detect the passage of said first and second interrupter means, respectively; at least one of said interrupter means comprising a radially extended, relatively thin member of relatively short width in comparison to the circumference of the shaft having a slot therein, the slot, the slotted interrupter means and its associated electro-optical means being relatively positioned to block any light from its associated light source to its associated light detector when the solid portions of said slotted interrupter means passes between but with said slot then allowing light to pass between them as said slotted interrupter means passes by.

2. The system of claim 1, wherein said primary light detector includes a series of optical glass fibers arranged in a vertical, radial array to form a thin, straight line light pick-up.

3. The system of claim 1, wherein at least one of said electro-optical means includes a second, secondary light source and a second, secondary light detector located at a different radial level than its primary light source and primary light detector, and wherein its associated interrupter means has a different pattern of light blocking and light passing portions at the radial level corresponding to said secondary light source and light detector in comparison to its radial level corresponding to said primary light source and light detector.

4. The system of claim 3, wherein said associated interrupter means comprises two integral, radially spaced portions, a bottom portion in which said slot is located and an upper portion having a lesser width than said bottom portion, said slot being located underneath said top portion, the leading edge of said bottom portion initially blocking said primary light source and light detector, and then after the leading edge of said upper portion blocking said secondary light source and detector, and thereafter said slot unblocking said primary light source and detector for a relatively short duration, and thereafter said secondary light source and light detector being unblocked by the passage of the trailing edge of said upper portion, and thereafter said primary light source and light detector being unblocked by the passage of the trailing edge of said bottom portion.

5. The system of either claim 1 or 4, wherein said circuit means produces a digital electrical output.

6. The system of claim 4, wherein said circuit means further includes a sub-circuit control means for out-putting the signal from said primary light detector only when the light from said secondary light source to said secondary light detector is blocked by its associated interrupter means.

7. A torque meter system for a load transmitting rotating shaft, comprising:
    first interrupter means for mounting on the shaft for rotation therewith;
    first electro-optical sensor means, having a primary light source and a spaced, primary light detector between which said first interrupter means passes and temporarily blocks the light going from said primary light source to said primary light detector, for detecting when said first interrupter passes it;
    second interrupter means for mounting on the shaft at a longitudinally spaced position on the shaft for rotation therewith; and
    second electro-optical means, having a primary light source and a spaced, primary light detector between which said second interrupter means passes and temporarily blocks the light going from said primary light source to said primary light detector, for detecting when said second interrupter means passes it; and
    electrical circuit means connected to said first and said second electro-optical detector means for comparing the relative times said first electro-optical means and said second electro-optical means detect the passage of said first and second interrupter means, respectively;
    at least one of said electro-optical means including a second, secondary light source and a second, secondary light detector located at a different radial level than its primary light source and primary light detector, and wherein its associated interrupter means has a different pattern of light blocking and light passing portions at the radial level corresponding to said secondary light source and light detector in comparison to its radial level corresponding to said primary light source and light detector;

said circuit means further including a sub-circuit control means for out-putting the signal from said primary light detector only when the light from said secondary light source to said secondary light detector is blocked by its associated interrupter means.

8. The system of claim 7, wherein said associated interrupter means comprises two integral, radially spaced portions, a bottom portion in which a slot is located and an upper portion having a lesser width than said bottom portion, said slot being located underneath said top portion, the leading edge of said bottom portion initially blocking said primary light source and light detector, and thereafter the leading edge of said upper portion blocking said secondary light source and detector, and thereafter said slot unblocking said primary light source and detector for a relatively short duration, and thereafter said secondary light source and light detector being unblocked by the passage of the trailing edge of said upper portion, and thereafter said primary light source and light detector being unblocked by the passage of the trailing edge of said bottom portion.

9. The system of claim 7, wherein at least one of said interrupter means comprises a radially extended, relatively thin member of relatively short width in comparison to the circumference of the shaft having a slot therein, the slot, the slotted interrupter means and its associated electro-optical means being relatively positioned to block any light from its associated light source to its associated light detector when the solid portions of said slotted interrupter means passes between but with said slot then allowing light to pass between them as said slotted interrupter means passes by.

10. The system of claim 7, wherein said circuit means produces a digital electrical output.

11. The system of claim 7, wherein said sub-circuit control means comprises a gate circuit.

12. A torque meter system for a load transmitting rotating shaft, comprising:

first interrupter means for mounting on the shaft for rotation therewith;

first electro-optical sensor means, having a primary light source and a spaced primary light detector between which said first interrupter means passes and temporarily blocks the light going from said light source to said light detector, for detecting when said first interrupter passes it;

second interrupter means for mounting on the shaft at a longitudinally spaced position on the shaft for rotation therewith; and second electro-optical means, having a primary light source and a spaced, primary light detector between which said second interrupter means passes and temporarily blocks the light going from said light source to said light detector, for detecting when said second interrupter means passes it; and electrical circuit means connected to said first and said second electro-optical detector means for comparing the relative times said first electro-optical means and said second electro-optical means detect the passage of said first and second interrupter means, respectively;

said primary light detector including a series of optical glass fibers arranged in a vertical, radial array to form a thin, straight line, light pick-up.

13. The system of claim 12, wherein at least one of said interrupter means comprises a radially extended, relatively thin member of relatively short width in comparison to the circumference of the shaft having a slot therein, the slot, the slotted interrupter means and its associated electro-optical means being relatively positioned to block any light from its associated light source to its associated light detector when the solid portions of said slotted interrupter means passes between but with said slot then allowing light to pass between them as said slotted interrupter means passes by.

* * * * *